(12) United States Patent
Mahler et al.

(10) Patent No.: US 10,677,690 B2
(45) Date of Patent: Jun. 9, 2020

(54) TEST PROBE FOR A FILTER

(71) Applicant: CAMFIL AB, Stockholm (SE)

(72) Inventors: Axel Mahler, Großensee (DE); Richard Addington, Kunshan Jiangsu (CN); Kenny Hedlund, Trosa (SE)

(73) Assignee: Camfil AB, Stockholm (SE)

(*) Notice: Subject to any disclaimer, the term of this patent is extended or adjusted under 35 U.S.C. 154(b) by 61 days.

(21) Appl. No.: 15/779,489

(22) PCT Filed: Dec. 14, 2016

(86) PCT No.: PCT/EP2016/080978
§ 371 (c)(1),
(2) Date: May 25, 2018

(87) PCT Pub. No.: WO2017/114657
PCT Pub. Date: Jul. 6, 2017

(65) Prior Publication Data
US 2018/0259428 A1    Sep. 13, 2018

(51) Int. Cl.
*G01N 1/22* (2006.01)
*G01M 3/04* (2006.01)
*B01D 46/00* (2006.01)

(52) U.S. Cl.
CPC ............ *G01N 1/2247* (2013.01); *G01M 3/04* (2013.01); *B01D 46/0086* (2013.01);
(Continued)

(58) Field of Classification Search
CPC . B01D 46/0086; B01D 2273/18; G01M 3/02; G01M 3/26; G01M 3/04; G01N 2001/2285; G01N 1/2247
See application file for complete search history.

(56) References Cited

U.S. PATENT DOCUMENTS 4,515,007 A * 5/1985 Herman .................. G01M 3/20
55/DIG. 9
RE31,952 E * 7/1985 Wilcox .............. B01D 46/0004
239/514
(Continued)

FOREIGN PATENT DOCUMENTS

WO    WO 2007/106003 A1    9/2007

OTHER PUBLICATIONS

International Search Report for Application No. PCT/EP2016/080978 dated Apr. 10, 2017 in 2 pages.

*Primary Examiner* — Justin N Olamit
(74) *Attorney, Agent, or Firm* — Knobbe, Martens Olson & Bear LLP

(57) ABSTRACT

A test probe for filter leakage detection. The test probe (1) has an elongated housing (5) with a longitudinal inlet portion for admitting gas into a first chamber of the housing through an inlet of the inlet portion, and an outlet portion for letting gas out of a second chamber of the housing through an outlet of the outlet portion. Further, the test probe has an intermediate element comprising a throttling portion. The intermediate element is arranged between the inlet portion and the outlet portion, wherein the first and second chambers are fluidly interconnected via the throttling portion, wherein the throttling portion is elongated and extends longitudinally of the housing, wherein the throttling portion is arranged to cause a smaller vacuum upstream of the throttling portion than downstream of the throttling portion when gas is sucked through the test probe.

20 Claims, 7 Drawing Sheets

(52) U.S. Cl.
CPC .. *B01D 2273/18* (2013.01); *G01N 2001/2285* (2013.01); *G01N 2001/2291* (2013.01)

(56) References Cited

U.S. PATENT DOCUMENTS

| | | | |
|---|---|---|---|
| 4,548,068 A * | 10/1985 | Gualtieri | B01D 46/0005 454/297 |
| 6,672,134 B2 * | 1/2004 | Bodnar | B01D 46/0086 73/28.01 |
| 7,658,787 B2 | 2/2010 | Morse et al. | |
| 7,739,926 B2 | 6/2010 | Morse et al. | |

* cited by examiner

TEST PROBE FOR A FILTER

FIELD OF THE INVENTION

The present invention relates to test probe for detecting leakage of a filter.

BACKGROUND OF THE INVENTION

In some environments where undesired substances are removed from a gas, such as air, by filtering the gas, it is important to continuously check that the filter is working and detect any leakage of the filter. One way of checking the filter is to use a test probe, by means of which gas is collected downstream of the filter and analyzed with respect to the undesired substance. Since it is desirable that the test probe does not noticeable interfere with the gas flow it cannot cover the whole area. Different concepts of test probes which are moved to scan the filter area have been developed. One kind thereof is an elongated test probe, which extends along the length or width of the filter and is moved back and forth perpendicularly of its longitudinal extension to scan the area in the vicinity of the filter surface. A typical elongated test probe is made of a tube with several inlet holes through the tube wall distributed along the length of the test probe, and a central outlet. However, this kind of test probe is subjected to problems with a nonlinear intake of air through the inlet holes, wherein the gas flow velocity through an inlet hole depends on the distance from inlet hole to the outlet, and thus differs along the length of the test probe. This in turn causes a lower sensitivity to leakage at the edges of the filter compared to a more centrally positioned leakage.

U.S. Pat. No. 7,658,787 discloses a test probe having several inlet openings, called sample ports, each being funnel shaped towards a respective outlet tube. The sample ports are arranged side by side along the probe. This probe design partly solves the problem, but at the prize of a large number of tubes. An alternative solution would therefore be desirable.

SUMMARY OF THE INVENTION

It would be advantageous to provide a solution which requires a less number of and/or has an even more linear air intake.

To better address this concern, in a first aspect of the invention there is presented a test probe for filter leakage detection in gas filtration, the test probe comprising:

an elongated housing having a longitudinal inlet portion for admitting gas into a first chamber of the housing through an inlet of the inlet portion, and an outlet portion for letting gas out of a second chamber of the housing through an outlet of the outlet portion; and an intermediate element comprising a throttling portion. The intermediate element is arranged between the inlet portion and the outlet portion. The first and second chambers are fluidly interconnected via the throttling portion, which is elongated and extends longitudinally of the housing. In an operative state where gas is sucked out of the outlet, the throttling portion is arranged to cause a lower vacuum upstream of the throttling portion than downstream of the throttling portion. Thereby the test probe has a more equal gas flow velocity through different parts of the inlet portion than a test probe lacking the throttling portion.

In accordance with an embodiment of the test probe, in the operative state, a mean gas flow velocity through the throttling portion is higher than a mean gas flow velocity through the inlet portion. Thereby a larger pressure drop is generated past the throttling portion than past the inlet portion, which forces the airflow distribution to even out along the throttling portion. In accordance with an embodiment of the test probe, a total open area of the throttling portion is smaller than a total open area of the inlet portion. This embodiment has the same advantage as the just mentioned embodiment. In accordance with an embodiment of the test probe, the total open area of the throttling portion is 1-80% of the total area of inlet portion.

In accordance with an embodiment of the test probe, the total open area of the throttling portion is provided by several holes distributed along the length of the throttling portion. The holes provide for fine tuning of the throttling effect along the length of the throttling portion.

In accordance with an embodiment of the test probe, the housing comprises an elongated front element and an elongated rear element, extending longitudinally of the housing and defining an interior space of the housing, which interior space is divided into the first and second chambers by the throttling portion, which extends between the front and rear elements through the interior space. This embodiment provides for a simple yet functional construction of the test probe.

In accordance with an embodiment of the test probe, the inlet portion comprises a front element first edge portion of the front element and a rear element first edge portion of the rear element, arranged adjacent and parallel to each other and in engagement with longitudinally spaced distance portions arranged between the front element first edge portion and the rear element first edge portion, wherein the spaces between the distance portions constitute openings into the first chamber.

In accordance with an embodiment of the test probe, the distance portions comprise protrusions of a comb shaped intermediate element first edge portion of the intermediate element.

In accordance with an embodiment of the test probe, the distance portions comprise at least one of dimples or washers.

In accordance with an embodiment of the test probe, the inlet comprises a longitudinal array of openings. This is advantageous in that the positions and shapes of the openings can be optimized to provide the desired performance of the test probe.

In accordance with an embodiment of the test probe, the front element comprises a front element second edge portion, wherein the rear element comprises a rear element second edge portion, wherein the intermediate element comprises a intermediate element second edge portion, wherein the front element second edge portion, rear element second edge portion and intermediate element second edge portion are engaged with each other, with the intermediate element second edge portion positioned between the other ones, wherein the front element further comprises a front wall extending between the front element first and second edge portions, wherein the rear element comprises a rear wall extending between the rear element first and second edge portions, wherein the intermediate element comprises an intermediate wall extending between the intermediate element first and second edge portions, which intermediate wall comprises a middle wall portion extending between the front wall and the rear wall and comprising the throttling portion.

In accordance with an embodiment of the test probe, the front wall and the rear wall are bent to form a rhombic transversal cross-section of the housing.

In accordance with an embodiment of the test probe, the intermediate wall is bent to have a stepped shape.

In accordance with an embodiment of the test probe, the throttling portion comprises a mesh.

In accordance with an embodiment of the test probe, the throttling portion comprises a porous material.

In accordance with an embodiment of the test probe, the throttling portion comprises a longitudinal array of holes. This is advantageous in that the positions and shapes of the holes can be optimized to provide the desired performance of the test probe.

In accordance with an embodiment of the test probe, comprising partitioning walls arranged transversally of the housing through the chambers dividing them into sub-chambers, wherein the outlet portion comprises an outlet at each sub-chamber.

In accordance with an embodiment of the test probe, comprising a third chamber between the first and second chambers, and an additional throttling portion extending in parallel with the throttling portion of the intermediate element and between the inlet portion and the intermediate portion, and which, in the operative state, is arranged to cause a smaller vacuum in upstream of the additional throttling portion than downstream of the additional throttling portion.

BRIEF DESCRIPTION OF THE DRAWINGS

The invention will now be described in more detail and with reference to the appended drawings in which.

DESCRIPTION OF EMBODIMENTS

Figure 1:
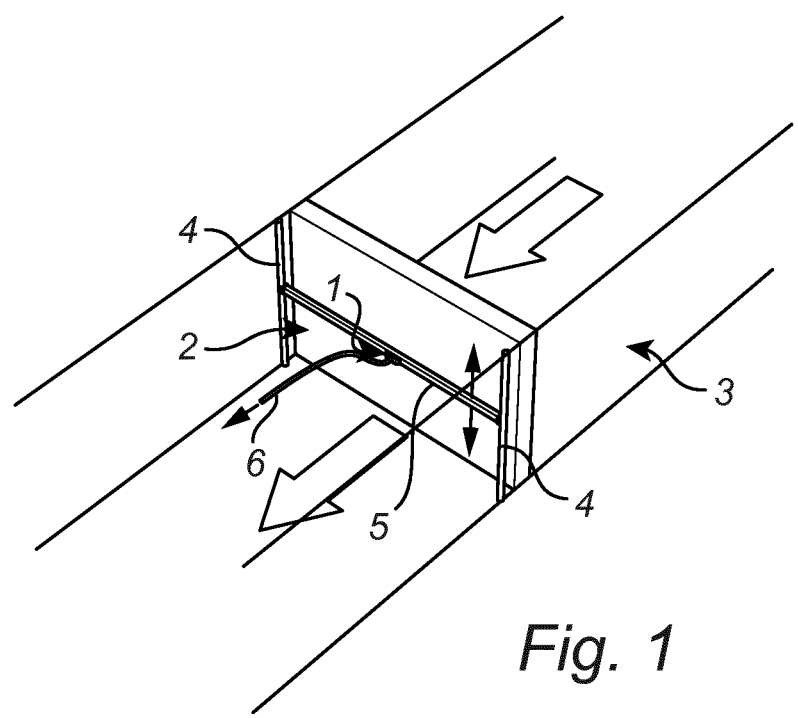
FIG. 1 schematically illustrates a test probe mounted at a filter.
Figure 2:
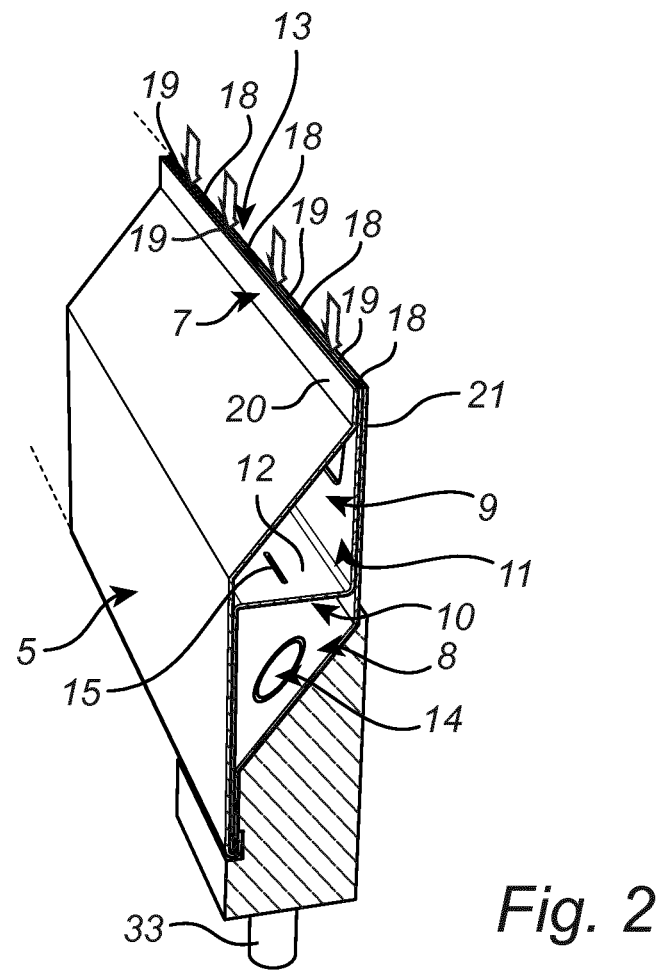
FIG. 2 is a perspective view of a cut out portion of an embodiment of a test probe according to the present invention.
Figure 3:
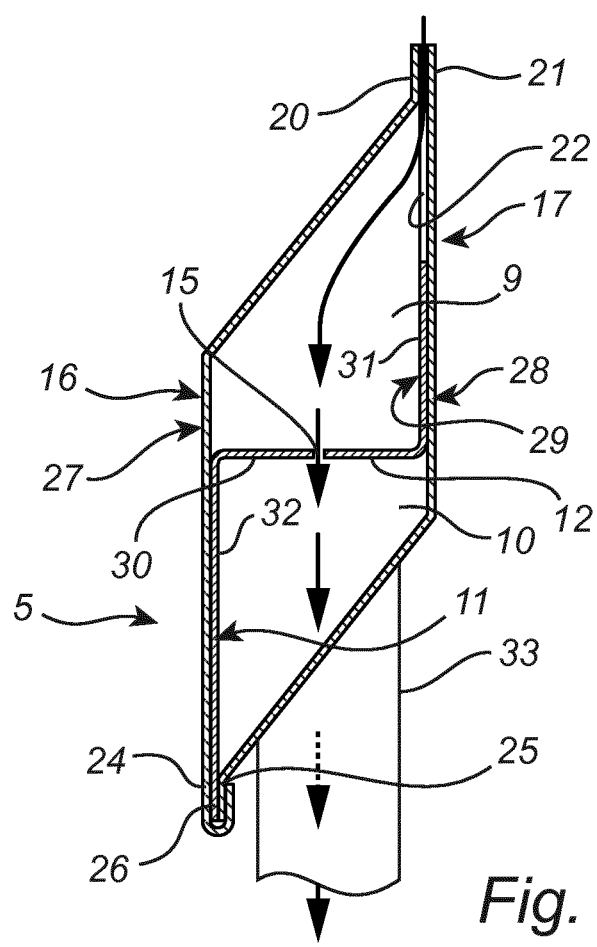
FIG. 3 is a cross-sectional view of the test probe shown in FIG. 2.
Figure 4:
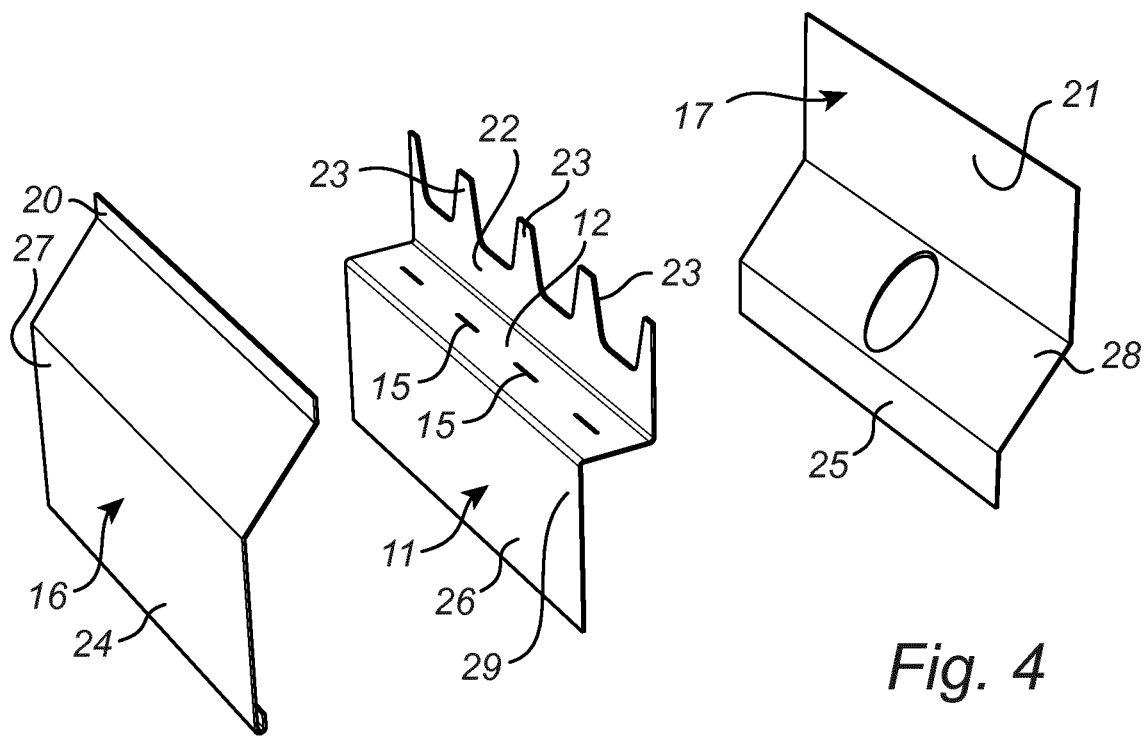
FIG. 4 is an exploded view of a portion of the test probe shown in FIG. 2.

An exemplifying use of a test probe 1 according to the present invention is for testing a filter 2 mounted in a duct 3, through which a gas flows. At the downstream side of the filter 2, it has a surface with a significant extension in two dimensions. The test probe 1 is elongated, and is attached at its ends to guides 4 mounted at opposite ends of the filter 2. The test probe 1 is mounted in the vicinity of the surface of the filter 2, and is arranged to be driven back and forth along the guides 4 in order to scan the filter 2 to check for leakages. Gas is sucked into the housing 5 of the test probe 1, and further through a tube 6 to an analyzer, such as a photometer or a particle counter, etc. depending on what undesired substance the filter is meant to remove, or what measurement technology is preferred by the user of the test probe.

More particularly, according to a first embodiment of the test probe the elongated housing 5 comprises a longitudinal inlet portion 7 for admitting gas into the housing 5, and an outlet portion 8 for letting gas out of the housing 5. Further, the housing 5 comprises a first chamber 9, a second chamber 10, and an intermediate element 11 comprising a throttling portion 12. Gas enters the first chamber 9, and thus the housing 5, through an inlet 13 of the inlet portion 7, and exits the second chamber 10, and thus the housing 5, through an outlet 14 of the outlet portion 8.

The intermediate element 11 is arranged between the inlet portion 7 and the outlet portion 8, and the first and second chambers 9, 10 are fluidly interconnected via the throttling portion 12, i.e. gas is able to flow from the first chamber 9 to the second chamber 10 via the throttling portion 12. In this embodiment of the test probe 1, the throttling portion 12 constitutes a partition wall which divides the housing 5 into the first and second chambers 9, 10.

The throttling portion 12 is elongated and extends longitudinally of the housing 5, and more particularly along the full length of the housing 5. The throttling portion 12 comprises several holes 15 distributed along the length of the throttling portion 12, and more particularly the holes 15 are consecutively arranged.

The housing 5 comprises an elongated front element 16 and an elongated rear element 17, extending longitudinally of the housing 5 and defining an interior space of the housing 5, which interior space is divided into the first and second chambers 9, 10 by the throttling portion 12, which extends between the front and rear elements 16, 17 through the interior space. At the inlet portion 7 the front and rear elements 16, 17 are positioned close to each other separated only by distance portions 18, which define the inlet 13 as several elongated openings 19 consecutively arranged along the length of the inlet portion 7. The longitudinal extension of the distance portions 18 is small relative to the longitudinal extension of the openings 19 such that the total extension of the inlet 13 constitutes a substantial part of the length of the inlet portion 7. Preferably, but not necessarily, there is a hole 15 opposite to each distance portion 18, and at least one hole 15 opposite to each opening 19.

More particularly, the inlet portion 7 is defined by a front element first edge portion 20 of the front element 16 and a rear element first edge portion 21 of the rear element 17, arranged adjacent and parallel to each other and in engagement with the longitudinally spaced distance portions 18 arranged between the front element first edge portion 20 and the rear element first edge portion 21. The spaces between the distance portions 18 constitute the openings 19 into the first chamber 9. Typically, the first edge portions 20, 21 are straight and parallel with each other, forming slit shaped openings 19. Thus, the inlet 13 can be regarded as linear, as opposed to the prior art test probe having a set of circular holes, allowing for placing the test probe 1 closer to the filter surface, which, in turn, increases the sensitivity of the test probe 1 by reducing the dilution of the gas and possible content of particles exiting a leakage of the filter before being captured by the test probe 1.

In this first embodiment, the intermediate element 11 has a comb shaped intermediate element first edge portion 22 comprising several protrusions, i.e. comb teeth, 23, which protrude in between the front element first edge portion 20 and the rear element first edge portion 21 and define the distance portions 18. In alternative embodiments the distance portions are for example dimples or washers, as will be elaborated below.

Furthermore, the front element 16 comprises a front element second edge portion 24, wherein the rear element 17 comprises a rear element second edge portion 25, wherein the intermediate element 11 comprises a intermediate element second edge portion 26, wherein the front element second edge portion 24, rear element second edge portion 25 and intermediate element second edge portion 26 are engaged with each other, with the intermediate element second edge portion 26 positioned between the other ones. The front element 16 further comprises a front wall 27 extending between the front element first and second edge portions 20, 24, the rear element 17 comprises a rear wall 28 extending between the rear element first and second edge portions 21, 25, and the intermediate element 11 comprises an intermediate wall 29 extending between the intermediate element first and second edge portions 22, 26, which intermediate wall 29 comprises a middle wall portion 30 extending between the front wall 27 and the rear wall 28 and comprising the throttling portion 12.

The front wall 27 and the rear wall 28 are bent to form a rhombic transversal cross-section of the housing 5, which is an advantageous shape. The intermediate wall 29 is bent to have a stepped shape, wherein the intermediate wall 29 has a first intermediate wall portion 31 extending adjacent to a part of the rear wall 28, and extending perpendicular to the middle wall portion 30 between the middle wall portion 30 and the intermediate element first edge portion 22, and a second intermediate wall portion 32 extending adjacent to a part of the front wall 27 and in parallel with the first intermediate wall portion 31, and extending perpendicular to the middle wall portion 30 between the middle wall portion 30 and the intermediate element second edge portion 26.

In an operative state, i.e. when the test probe 1 is arranged at a filter and used for checking the filter for leakages, gas is remotely actively sucked through a tube 33 connected with the outlet 14. Consequently the gas, which has passed through the filter 2, is sucked in through the inlet 13, through the holes 15 of the throttling portion 12, and out of the outlet 14. Thus vacuum, i.e. an under pressure, is caused within the housing 5. The throttling portion 12 is arranged to, in this operative state, cause a smaller vacuum upstream of the throttling portion, i.e. in the first chamber 9, than downstream of the throttling portion 12, i.e. in the second chamber 10. Due to this pressure relation, the gas that enters the first chamber through the openings 19 passes the openings 19 at a relatively similar gas flow velocity for all openings along the whole length of the housing 5. Thereby a leakage is equally detectable independently of where in the filter it occurs.

The mechanisms causing this are as follows. If the derivative $\delta\Delta p/\delta v$ is large, the forces on a small air package towards an area with lower speed is large. This means that a large $\delta\Delta p/\delta v$ will force more air to choose the path that otherwise would have low velocity. Since the pressure drop in a high Reynolds number Re flow, where inertial effects are dominant, past an obstacle is proportional to $v^2$, $\delta\Delta p/\delta v$ is proportional to v. Consequently, by reducing the open area at the throttling portion 12, and thereby increasing v locally, that derivative is increased. At the same time, the forces required to change the direction of the air, which are also inertial, can affect the air flow in the lower speed region upstream of the throttling portion 12.

Preferably, the total open area of the throttling portion, i.e. the total area of the holes 15 is smaller than the total open area of the inlet portion 7, i.e. the total area of the openings 19. An advantageous relation between the total open areas is that the total open area of the throttling portion is 1-80% of the total area of the inlet portion 7. A more preferred relation is 10-60%, and a most preferred relation is 20-40%. It should be noted that if the percentage is too low the required suction effort becomes too high, while if the percentage is too high the desired effect of evening out the airflow distribution along the throttling portion 12 becomes too low.

Figure 5:
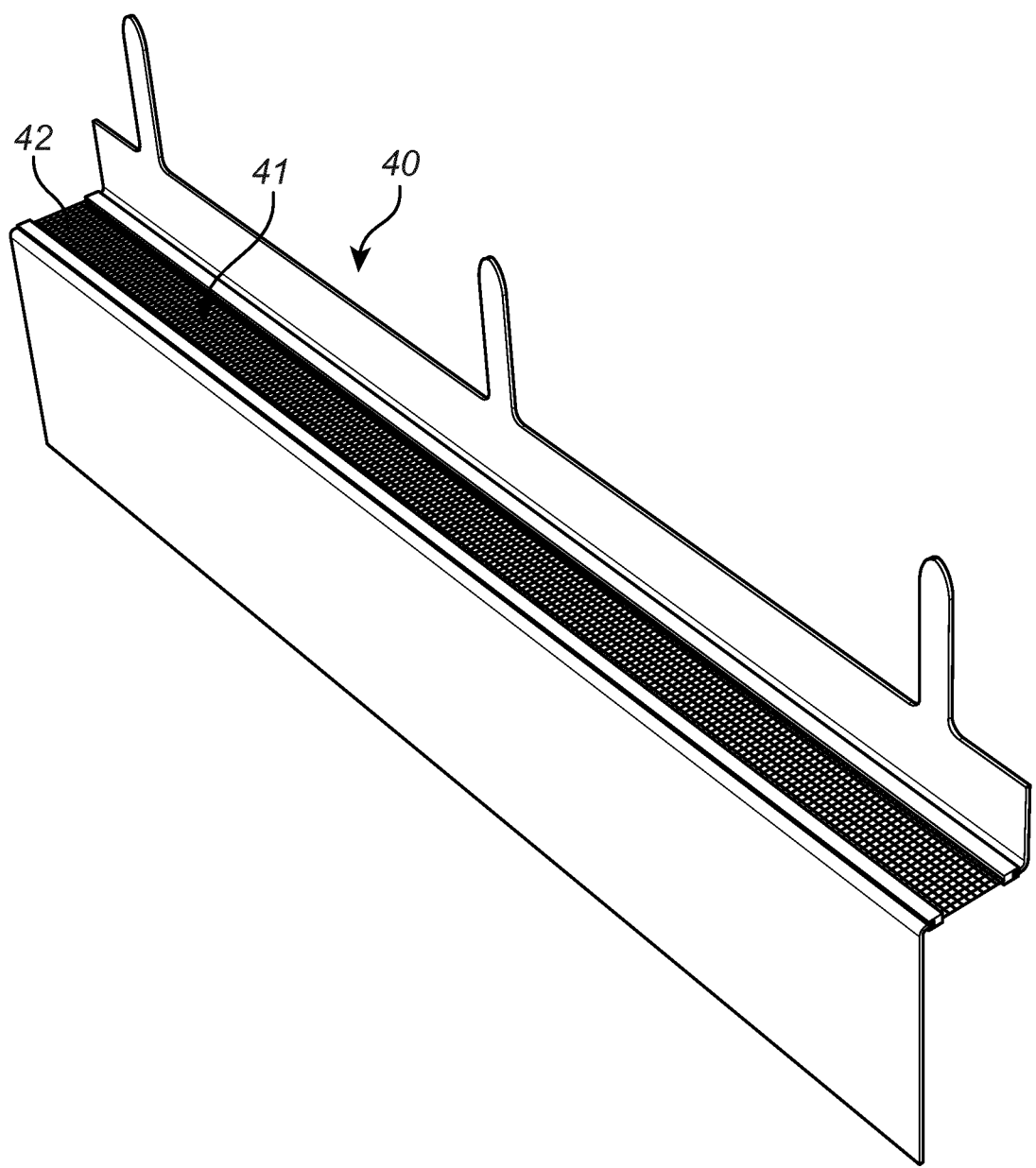
FIGS. 5-7 are schematic perspective views of a part of an internal element of the test probe according to different embodiments thereof.

According to a second embodiment of the test probe, the throttling portion 41 of the intermediate element 40 comprises a mesh 42 as a substitute for the holes 15 of the first embodiment, as illustrated in FIG. 5.

Figure 6:
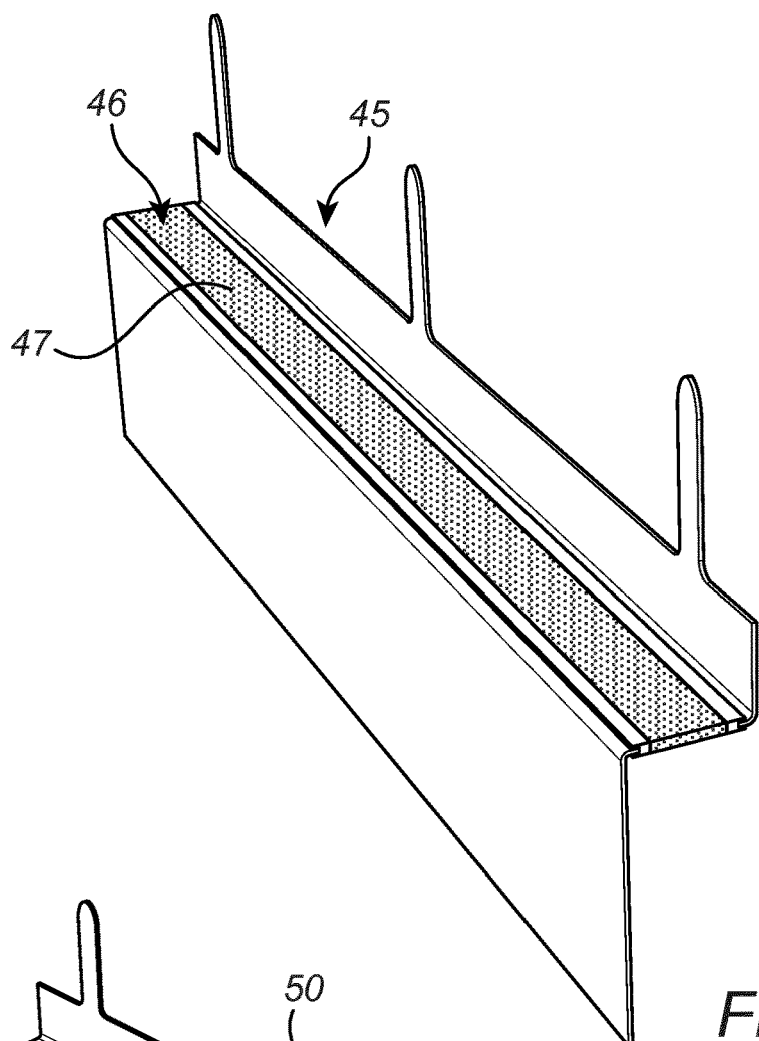

According to a third embodiment of the test probe, the throttling portion 46 of the intermediate element 45 comprises a porous material, such as a filter medium 47, as illustrated in FIG. 6. The filter medium 47 is chosen such that it lets any particles to be detected pass, but still limits the gas flow.

Figure 7:
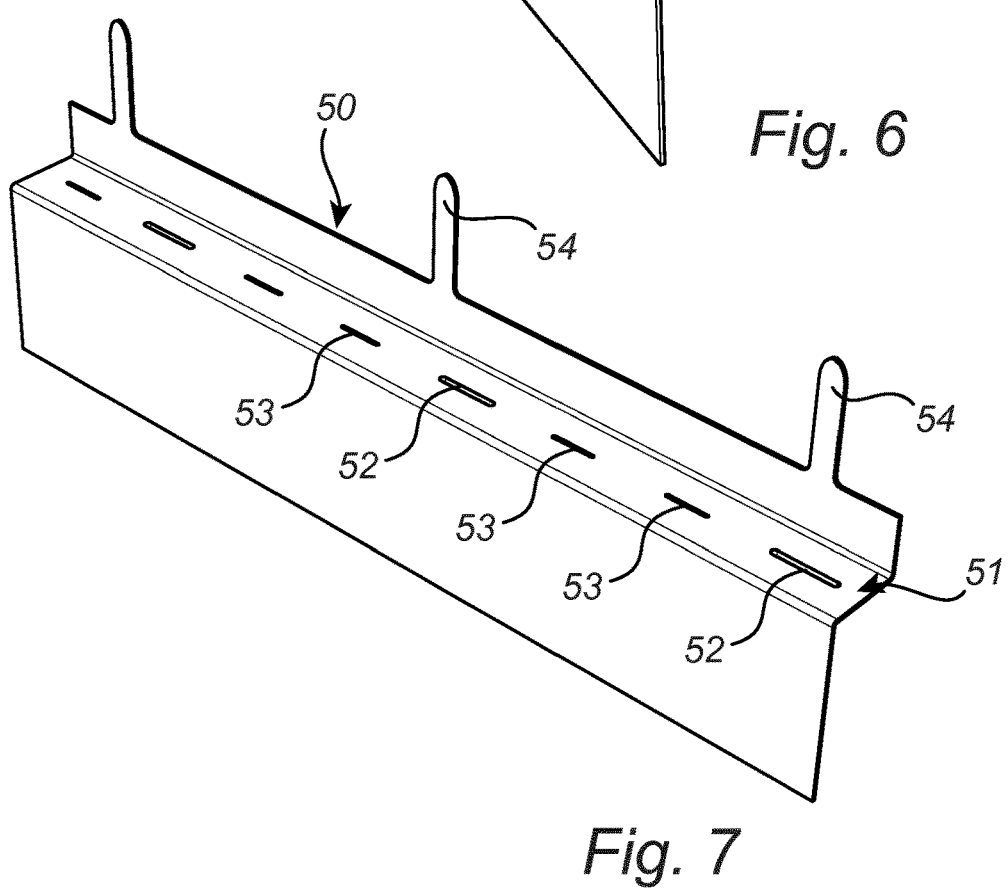

According to a fourth embodiment of the test probe, the holes 52, 53 of the throttling portion 51 of the intermediate portion 50 have different dimensions, such that a hole 52 arranged opposite to a distance portion 54 is larger than a hole 53 arranged opposite to an opening at the inlet, i.e. between the distance portions 54, as illustrated in FIG. 7. This is to compensate for the slight hindrance that the distance portions 54 cause.

Figure 8:
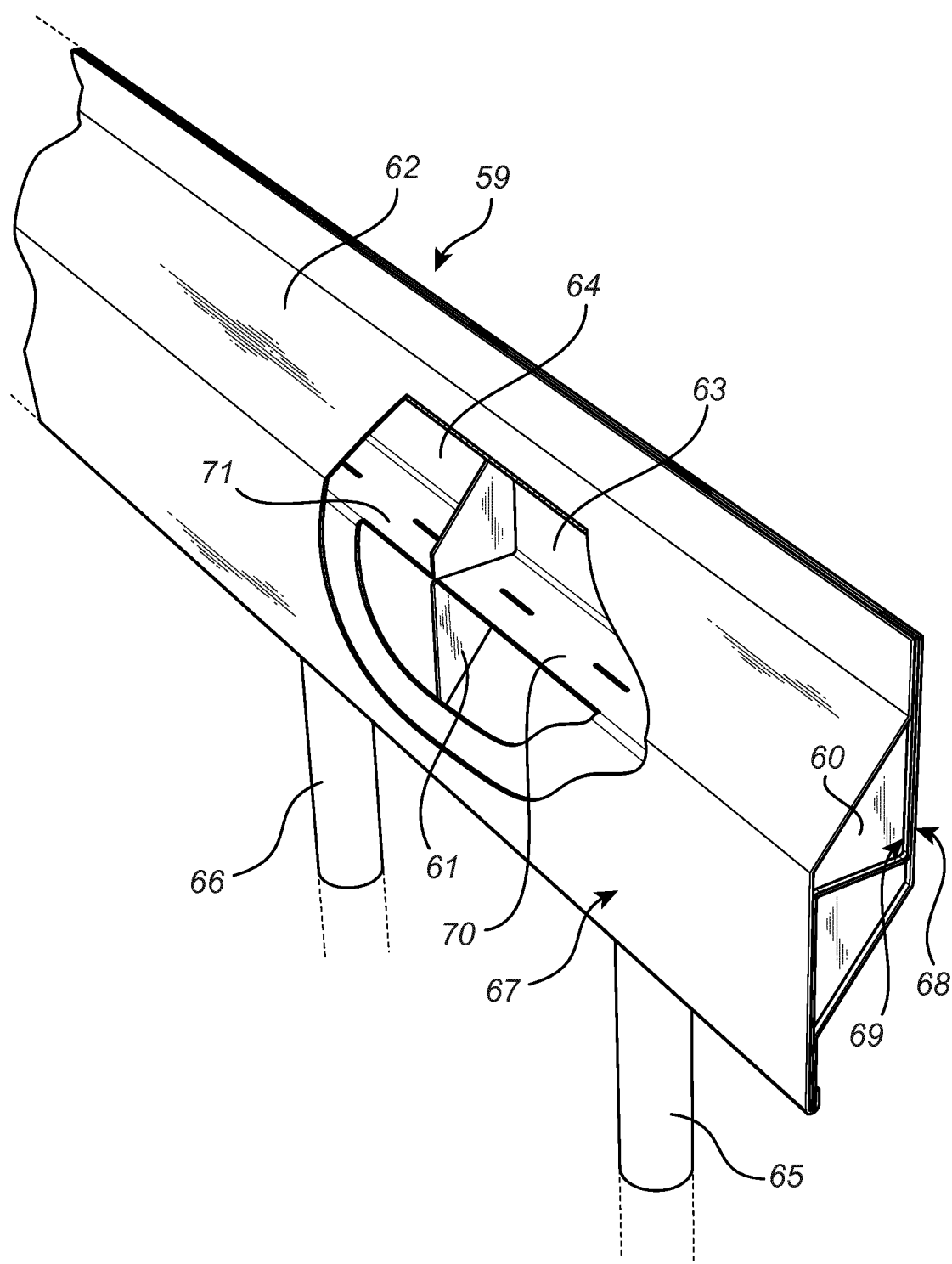
FIG. 8 is a partly cut away perspective view of a portion of another embodiment of the test probe.

According to a fifth embodiment of the test probe 59, it comprises partitioning walls 60, 61 arranged transversally of the housing 62 through the first and second chambers dividing them into sub-chambers 63, 64, wherein the outlet portion comprises an outlet at each sub-chamber 63, 64, as shown in FIG. 8. A respective tube 65, 66 is connected with each outlet port. These partitioning walls 60, 61 and sub-chambers 63, 64 can be provided either as individual partitioning walls 60, 61 inserted into the same housing 62 or as several individual housings, which are attached to each other side by side. In this embodiment, each partitioning wall 60, 61 extends transversally of the test probe 59 between the front and rear elements 67, 68, and the intermediate element 69 is divided into sections 70, 71. Thus, each section 70 extends between two adjacent partitioning walls 60, 61.

Figure 9:
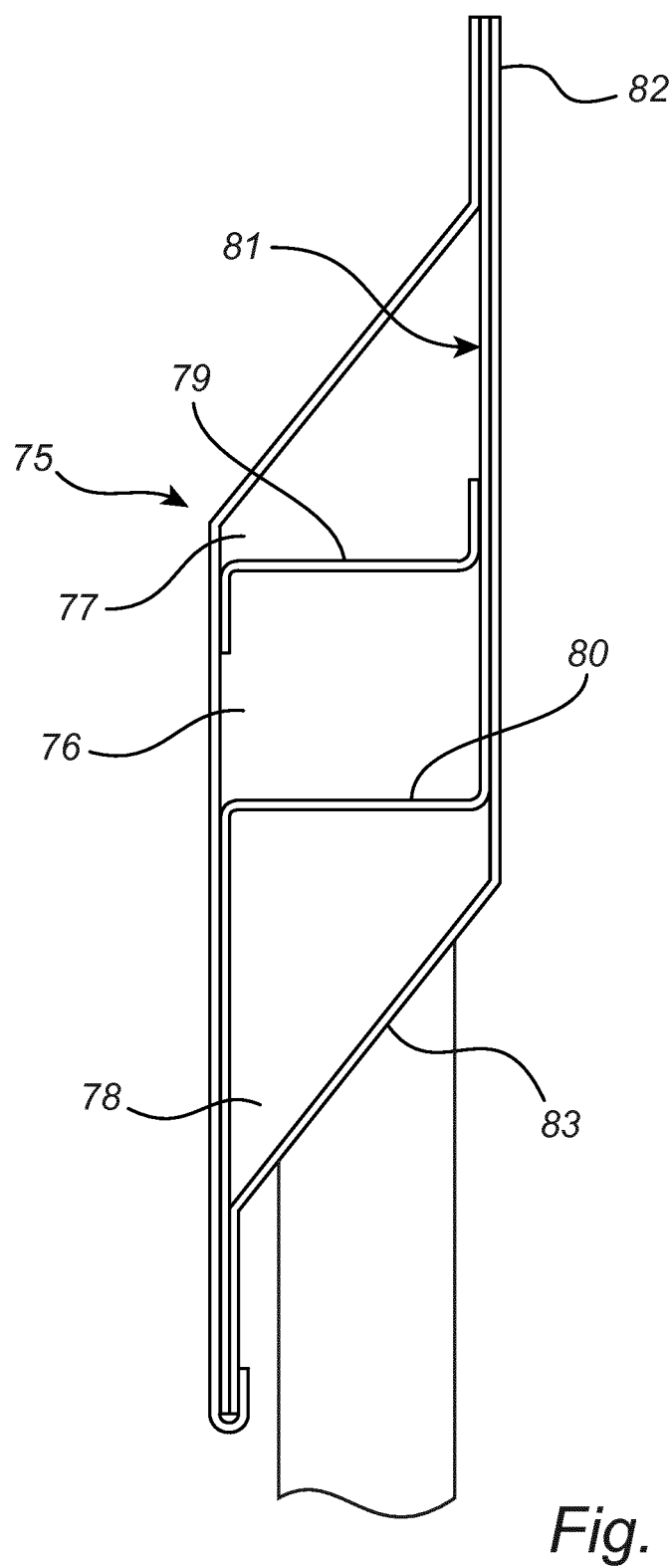
FIG. 9 is a cross-sectional view of another embodiment of the test probe.

According to a sixth embodiment of the test probe 75 it comprises a third chamber 76 between the first and second chambers 77, 78, and an additional throttling portion 79 extending in parallel with the throttling portion 80 of the intermediate element 81 and between the inlet portion 82 and the throttling portion 80 of the intermediate element 81, as illustrated in FIG. 9. In the operative state, i.e. when the test probe 75 is in use, the additional throttling portion 79 is arranged to cause a smaller vacuum upstream of the additional throttling portion 79 than downstream of the additional throttling portion 79. As is understood by the person skilled in the art, alternatively, the additional throttling portion 79 can be provided between the throttling portion of the intermediate element 81 and the outlet portion 83. This double throttling portion embodiment can be provided to have a lower total pressure drop over the whole test probe than the embodiments having a single throttling portion while achieving the same equalization of the gas flow velocity.

Figure 10:
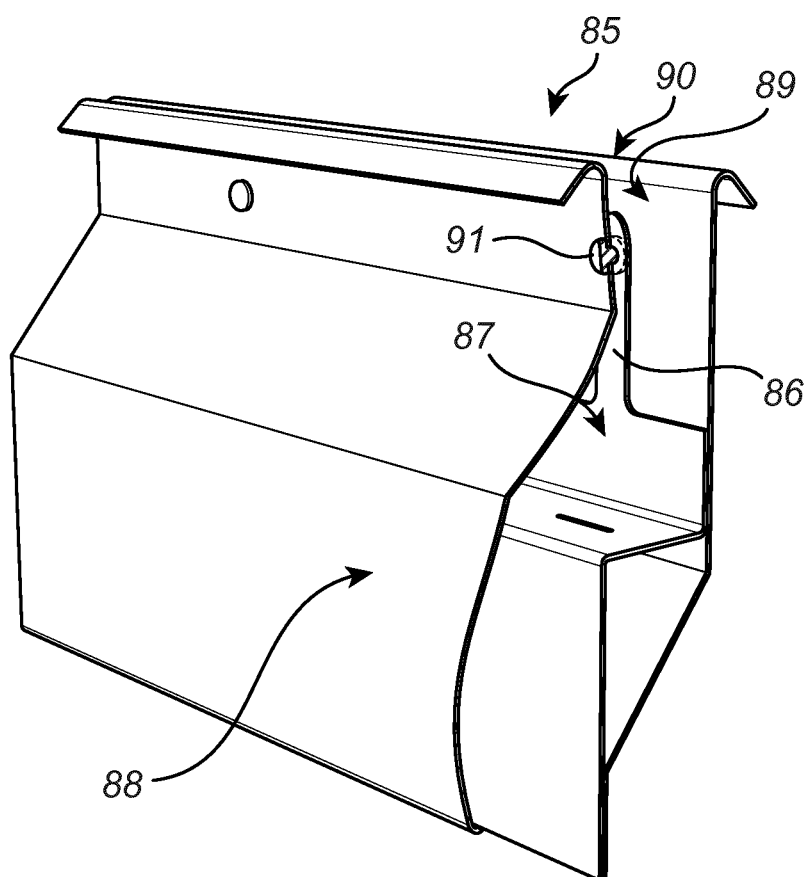
FIG. 10 is a partly cut out view of a section of another embodiment of the test probe.

According to a seventh embodiment of the test probe 85, as illustrated in FIG. 10, the protrusions 86 of the intermediate element 87 separating the front element 88 from the rear element 89 at the inlet portion 90 can be regarded as washers. Each protrusion 86 is provided with a boring close to its free end, and the front and rear elements 88, 89 are provided with borings aligned with the boring of the protrusion. A fastening element, such as a rivet, 91 extends through the borings and clamp the elements 87, 88, 89 together.

Figure 11:
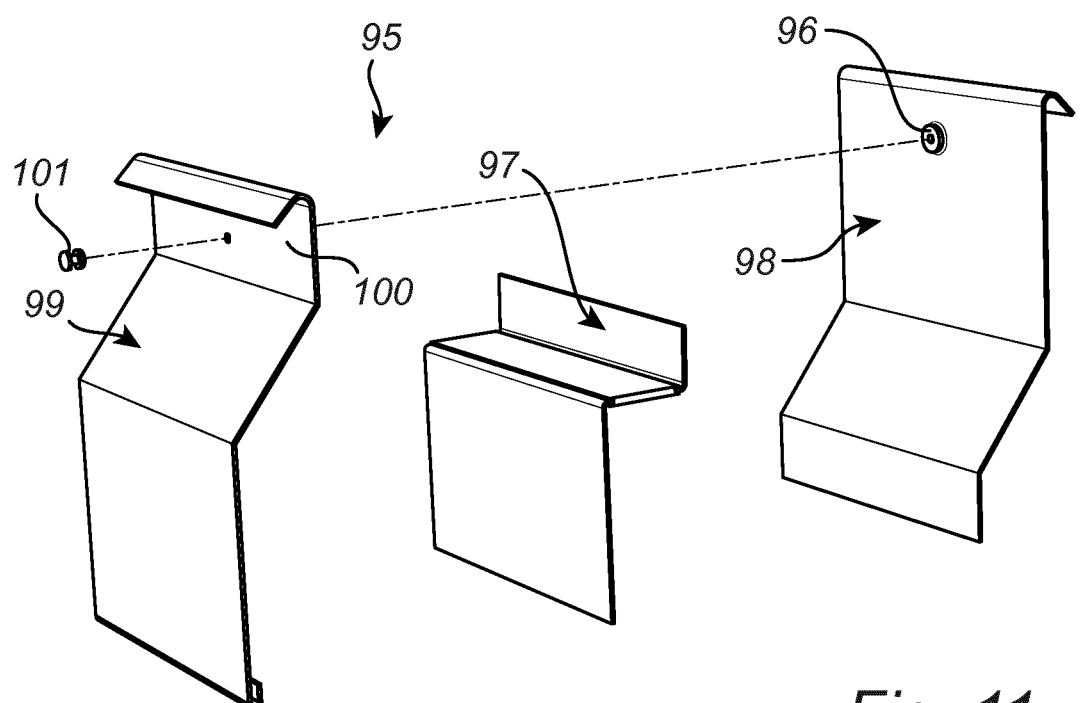
FIG. 11 is an exploded view of a section of another embodiment of the test probe.

According to an eighth embodiment of the test probe 95, a short segment of which is shown in the exploded view of FIG. 11, dimples 96 are instead arranged as distance elements for providing the opening of the inlet portion. In this eighth embodiment the intermediate element 97 is attached to the rear element 98 below the inlet portion 100, and thus it does not reach in between the front element 99 and the rear element 98 at the inlet portion 100. The dimples are formed in the rear element 98 at the inlet portion 100, but they can be formed in the front element 99 instead of or in addition to the dimples of the rear element 98. The front and rear elements 99, 98 are interconnected by means of rivets 101 or some other suitable fastening element.

The seventh and eighth embodiments can be provided with any one of the different kinds of throttling portions described above. Furthermore, it would be understood by the person skilled in the art what features of the different embodiments can be combined although not explicitly written above.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A test probe for filter leakage detection configured to be arranged at a downstream surface of a filter, the test probe comprising:
   a housing having a longitudinal extension and a lateral extension and being elongated in the longitudinal extension, and having an inlet portion being elongated in a direction of said longitudinal extension, for admitting gas into a first chamber of the housing through an inlet of the inlet portion, and an outlet portion for letting gas out of a second chamber of the housing through an outlet of the outlet portion, the outlet portion being configured to be connected to an analyzer; and
   an intermediate element comprising a throttling portion; wherein the intermediate element is arranged between the inlet portion and the outlet portion, wherein the first and second chambers are fluidly interconnected via the throttling portion, wherein the throttling portion is elongated in the direction of said longitudinal extension of the housing, wherein, in an operative state where gas is sucked out of the outlet, the throttling portion is arranged to cause a smaller vacuum upstream of the throttling portion than downstream of the throttling portion.

2. The test probe according to claim 1, wherein the throttling portion is arranged to provide, in the operative state, a mean gas flow velocity through the throttling portion that is higher than a mean gas flow velocity through the inlet portion.

3. The test probe according to claim 1, wherein a total open area of the throttling portion is smaller than a total open area of the inlet portion.

4. The test probe according to claim 1, wherein a total open area of the throttling portion is 20-40% of a total area of the inlet portion.

5. The test probe according to claim 3, wherein the total open area of the throttling portion is provided by several holes distributed along a length of the throttling portion.

6. The test probe according to claim 1, wherein the housing comprises an elongated front element and an elongated rear element, extending longitudinally of the housing and defining an interior space of the housing, which interior space is divided into the first and second chambers by the throttling portion, which extends through the interior space between the front and rear elements.

7. The test probe according to claim 6, wherein the inlet portion comprises:
   a front element first edge portion of the front element; and
   a rear element first edge portion of the rear element, said front element first edge portion and rear element first edge portion being arranged adjacent and parallel to each other and in engagement with longitudinally spaced distance portions arranged between the front element first edge portion and the rear element first edge portion, wherein spaces between the distance portions constitute openings into the first chamber.

8. The test probe according to claim 7, wherein the distance portions comprise protrusions of a comb shaped intermediate element first edge portion of the intermediate element.

9. The test probe according to claim 7, wherein the distance portions comprise at least one of dimples or washers.

10. The test probe according to claim 6, wherein the inlet comprises a longitudinal array of openings.

11. The test probe according to claim 8, wherein the front element comprises a front element second edge portion, wherein the rear element comprises a rear element second edge portion wherein the intermediate element comprises an intermediate element second edge portion, wherein the front element second edge portion, rear element second edge portion and intermediate element second edge portion are engaged with each other, with the intermediate element second edge portion positioned between the other ones, wherein the front element further comprises a front wall extending between the front element first and second edge portions, wherein the rear element comprises a rear wall extending between the rear element first and second edge portions, wherein the intermediate element comprises an intermediate wall extending between the intermediate element first and second edge portions, which intermediate wall comprises a middle wall portion extending between the front wall and the rear wall and comprising the throttling portion.

12. The test probe according to claim 11, wherein the front wall and the rear wall are bent to form a rhombic transversal cross-section of the housing.

13. The test probe according to claim 11 wherein the intermediate wall is bent to have a stepped shape.

14. The test probe according to claim 1, wherein the throttling portion comprises a mesh.

15. The test probe according to claim 1, wherein the throttling portion comprises a porous material.

16. The test probe according to claim 1, wherein the throttling portion comprises a longitudinal array of holes.

17. The test probe according to claim 1, comprising partitioning walls arranged transversally of the housing through the chambers dividing them into sub-chambers, wherein the outlet portion comprises an outlet at each sub-chamber.

18. The test probe according to claim 1, comprising a third chamber between the first and second chambers, and an additional throttling portion extending in parallel with the throttling portion of the intermediate element.

19. The test probe according to claim 2, wherein a total open area of the throttling portion is smaller than a total open area of the inlet portion.

20. The test probe according to claim 4, wherein the total open area of the throttling portion is provided by several holes distributed along the length of the throttling portion.

* * * * *

UNITED STATES PATENT AND TRADEMARK OFFICE
CERTIFICATE OF CORRECTION

PATENT NO. : 10,677,690 B2
APPLICATION NO. : 15/779489
DATED : June 9, 2020
INVENTOR(S) : Axel Mahler Page 1 of 1

It is certified that error appears in the above-identified patent and that said Letters Patent is hereby corrected as shown below:

On the Title Page

Below item (65) "US 2018/0259428 A1 Sep. 13, 2018" insert:
--Foreign Application Priority Data
Dec. 28, 2015 (SE) ....................... 1551716-2--.

Signed and Sealed this
Eighth Day of December, 2020

Andrei Iancu
*Director of the United States Patent and Trademark Office*